US009653963B2

(12) United States Patent
Schmid et al.

(10) Patent No.: US 9,653,963 B2
(45) Date of Patent: May 16, 2017

(54) DIRECT DRIVE FOR A ROTATION MACHINE, PARTICULARLY FOR A CONTAINER TREATMENT MACHINE

(71) Applicant: Schaeffler Technologies GmbH & Co. KG, Herzogenaurach (DE)

(72) Inventors: Gunter Schmid, Nuremberg (DE); Thomas Dittenhofer, Humprechtshausen (DE); Ralf Schuler, Wichtshausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 309 days.

(21) Appl. No.: 14/386,113

(22) PCT Filed: Jan. 23, 2013

(86) PCT No.: PCT/EP2013/051205
§ 371 (c)(1),
(2) Date: Sep. 18, 2014

(87) PCT Pub. No.: WO2013/139502
PCT Pub. Date: Sep. 26, 2013

(65) Prior Publication Data
US 2015/0097454 A1    Apr. 9, 2015

(30) Foreign Application Priority Data
Mar. 23, 2012   (DE) .................. 10 2012 204 721

(51) Int. Cl.
*H02K 7/08*    (2006.01)
*H02K 5/10*    (2006.01)
(Continued)

(52) U.S. Cl.
CPC ................. *H02K 7/08* (2013.01); *B67C 3/22* (2013.01); *H02K 1/185* (2013.01); *H02K 3/522* (2013.01);
(Continued)

(58) Field of Classification Search
CPC .......... B67C 3/22; H02K 1/185; H02K 26/00; H02K 3/522; H02K 5/10; H02K 7/08; H02K 11/0015; H02K 11/21
(Continued)

(56) References Cited

U.S. PATENT DOCUMENTS 4,315,171 A    2/1982  Schaeffer
4,661,756 A *  4/1987  Murphy .................. H02P 25/08
                                                     310/168
(Continued)

FOREIGN PATENT DOCUMENTS

CN    202111540    1/2012
DE    19756575     7/1999
(Continued)

*Primary Examiner* — Alex W Mok
(74) *Attorney, Agent, or Firm* — Volpe and Koenig, P.C.

(57) ABSTRACT

A direct drive for a rotation machine, particularly for a container treatment machine, this drive including a fixed machine part (1) and a machine part (2) rotating around a vertical machine axis, wherein the rotating machine part (2) is rotationally connected to the fixed machine part (1) by a roller bearing (3) arranged between the two machine parts (1, 2) and having an outer bearing ring (4), an inner bearing ring (5) and a plurality of rolling elements rolling between said bearing rings (4, 5), and can be driven by a torque motor (7). On the rotating machine part (1), a plurality of magnets (8) is provided, surrounding the rotating machine part, while on the fixed machine part (1), a stator (12) formed of a plurality of electric coils (9, 10, 11) is arranged, such that the rotating machine part (2) can be set in a defined rotational motion through an electromagnetic field generated when the (Continued)

stator (12) is energized in cooperation with the magnets (8). The stator (12) on the fixed machine part (1) is formed as a full ring of 360° covering, without gaps, all magnets (8) on the rotating machine part (2), this full ring being composed of a number of stator ring segments (13.1, 13.2, 13.3, 13.4, 13.5) adjacent to one another and connected to one another by an electrical series connection and also composed of a number of stop elements (14.1, 14.2, 14.3, 14.4, 14.5) arranged between the stator ring segments (13.1, 13.2, 13.3, 13.4, 13.5) for fixing the stator ring segments (13.1, 13.2, 13.3, 13.4, 13.5) in a circumferential and radial direction.

8 Claims, 3 Drawing Sheets

(51) Int. Cl.
| | | |
|---|---|---|
| *H02K 1/18* | (2006.01) | |
| *H02K 11/00* | (2016.01) | |
| *B67C 3/22* | (2006.01) | |
| *H02K 3/52* | (2006.01) | |
| *H02K 11/21* | (2016.01) | |
| *H02K 26/00* | (2006.01) | |

(52) U.S. Cl.
CPC ............... *H02K 5/10* (2013.01); *H02K 11/21* (2016.01); *H02K 26/00* (2013.01)

(58) Field of Classification Search
USPC ......................................................... 310/71
See application file for complete search history.

(56) References Cited

U.S. PATENT DOCUMENTS

| | | | |
|---|---|---|---|
| 5,592,731 A | | 1/1997 | Huang et al. |
| 6,748,739 B1 | * | 6/2004 | Hirano .................. F04B 49/06 417/44.2 |
| 8,302,767 B2 | | 11/2012 | Wilhelm et al. |
| 8,624,191 B2 | | 1/2014 | Franke et al. |
| 2004/0057262 A1 | * | 3/2004 | Tanaka .................. H02M 7/487 363/132 |
| 2005/0082938 A1 | | 4/2005 | Schmidt et al. |
| 2013/0271056 A1 | * | 10/2013 | Bunte .................. F03D 7/0224 318/503 |

FOREIGN PATENT DOCUMENTS

| | | |
|---|---|---|
| DE | 10210071 | 10/2003 |
| DE | 102007042254 | 4/2009 |
| WO | 2008022737 | 2/2008 |

* cited by examiner

DIRECT DRIVE FOR A ROTATION MACHINE, PARTICULARLY FOR A CONTAINER TREATMENT MACHINE

FIELD OF THE INVENTION

The invention concerns a direct drive for a rotation machine, the direct drive being advantageously suitable for use with container treatment machines.

BACKGROUND

Container treatment machines are used above all in the beverages and medicine industry as also in the chemical industry and are known in the most different of forms as stretching-blowing machines for the manufacture of plastic containers or as machines for cleaning, filling, sealing, printing and labelling bottles, cans, tubes or other containers made out of a plastics or metallic material. They are made as a general rule as rotary machines consisting substantially of a fixed machine part and a machine part rotating about a vertical machine axis, the rotating machine part being rotationally connected to the fixed machine part by means of a roller bearing arranged between the two machine parts and consisting of an outer bearing ring, an inner bearing ring and a plurality of rolling elements rolling between said bearing rings. On the rotating machine part are generally arranged a turntable and a plurality of treating stations comprising functional elements that are adapted to the respective type of treatment and interact with the containers to be treated. Depending on the size and the purpose of use of the plant, these turntables can have a diameter of up to 7 m and a weight of up to 7 tons and are operated at rotational speeds of up to 6 $min^{-1}$ and, despite the resulting high load, their rotational speed must be precisely controllable in order to enable, for example, a compensation for fluctuations of capacity.

According to WO 2008/022737 A1, such container treatment machines are driven conventionally through a servo-motor that uses an appropriate step-down gear unit to move a pinion that engages a gearing on the rotating machine part and thus makes it turn.

A drawback of such a conventional drive, however, is that this drive does not operate without wear and the pinion-and-gearing combination must be intensively greased regularly in order to assure the desired durability. However, as a result, it is possible for the surroundings to be contaminated by dripping lubrication grease which, with a view to the applicable hygienic regulations, is a drawback particularly in beverage bottling plants. In addition, due to the pinion-and-gearing combination, acoustic noise and body-borne sound as also mechanical dissipation of energy are generated during rolling, and this contributes to an undesired high noise level and is detrimental to the energy efficiency of the plant. Moreover, it has been noted in conventional drive concepts that in the case of an emergency shut-down, the machines driven by these drives cannot be decelerated by the motors in case of an emergency shut-down due to the high moment of inertia of the rotationally mounted machine part because this would overload and destroy the gear unit and the pinion. This therefore necessitates the use of additional mechanical brakes thus disadvantageously increasing work and costs required by the machine.

To avoid these drawbacks WO 2008/022737 A1 therefore proposes to make the drive of a container treatment machine as a direct drive using a torque motor, wherein in place of the hitherto used gearing, a continuous crown with a plurality of magnets is provided on the rotating machine part and, on the fixed machine part is arranged at least one stator made up of a plurality of electric coils that covers only a fractional sector of the magnet crown, so that through an electromagnetic field generated by energising the stator, in interaction with the magnets, the rotating machine part can be set into a defined rotational motion. The size of the stator and the number of integrated electric coils are variable and depend on the size, the needed torque and the required rotational speed of the turntable. For achieving a maximum torque, it is recommended to arrange a plurality of such stators around the crown of magnets.

Such a direct drive no doubt has the advantage that it no longer comprises a mechanical connection between the fixed and the rotating part and therefore operates free of wear. It has however proved to be disadvantageous because the individual stators cover the magnets only partly, so that many angular regions between the segment-shaped stators are freely accessible and constitute a potential source of danger for the assemblers and operators because of the high forces of attraction of the magnets arranged unprotected on the rotating machine part. It is likewise a drawback that, for supporting the magnetic forces of attraction acting in radial direction between the stators and the magnets, the individual segment-shaped stators are fixed on the fixed machine part by fastening screws that are screwed into the stators because as a result of this the fixed machine part and the bearing ring of the rolling bearing connected to this can get deformed due to the load being applied only segment-wise so that the functioning and the durability of the rolling bearing is limited. Over and above, it is a further drawback that, in particular, in the case of very large turntable diameters that are operated with very high torques, the magnets generally fixed on correspondingly large rolling bearings between the fixed and the rotating machine part are required in very large piece numbers and, due to the exposed angular regions between the individual stators, also in very large dimensions so that, because of their very high world market price, they cause very high manufacturing costs for the drive.

SUMMARY

Departing from the described drawbacks of the prior art, the invention is based on the object of providing a concept for a direct drive for a rotation machine, in particular for a container treatment machine, which effectively avoids the drawbacks that result from the exposed angular regions between the individual stators and their fixing on the fixed machine part.

The above object is achieved by the invention in a direct drive by the fact that the stator on the fixed machine part is made as a full ring, without any gap, configured continuously over 360° and covering all the magnets on the rotating machine part while being made up of a plurality of adjoining stator ring segments that are connected to one another through an electrical series connection, and of a plurality of stop elements disposed between the stator ring segments for fixing the stator ring segments in circumferential and in radial direction.

Advantageous embodiments and further developments of the direct drive configured according to the invention will be described in the dependent claims.

Thus, in the direct drive configured according to the invention, each of the individual stator ring segments is made up of a ferrous metal yoke and of a plurality of toothed metal sheets stacked on one another on an upper and a lower side of the yoke with copper coils wound around the teeth of the sheets for forming individual electric coils. The number of teeth and of the electric coils formed by them is variable and depends on the size and number of the individual stator ring segments, the magnitude of the required torque and of the required speed of rotation of the turntable as well as on the number and size of the magnets used. It is proved to be particularly advantageous to make all the magnets as permanent magnets out of the materials hard ferrite, samarium-cobalt or neodymium-iron-boron and to fix them on the outer peripheral surface of the outer bearing ring of the rolling bearing connected to the rotating machine part.

A further characterising feature of the direct drive configured according to the invention is that the individual coils of the stator ring segments are connected electrically in series through a star-delta connection with three electrically offset phases of 120° and are controllable through a single servo controller with a voltage intermediate-circuit converter. In this way, each coil of the stator is successively activated, phase-displaced relative to the preceding coil, so that the circulating electromagnetic fields generated cause, in interaction with the magnetic fields of the permanent magnets, a rotary motion of the rotating machine part. All the adjoining stator ring segments are connected through a respective connecting cable to one another through a plug connector and only one first and one last stator ring segment comprises, in place of a connecting cable, a servo controller connection or a star-delta element. Besides this, it is advantageous if the voltage intermediate-circuit converter permits a bidirectional flow of power because, in this way, an emergency operation program can be provided in the controls which, in the case of a machine standstill or a line failure, permits a synchronised angular switch-off of the coils of all the stator ring segments and of all other drives of a complex plant using the power return flow into the power network.

A further feature of the direct drive configured according to the invention is that the stop elements arranged between the stator ring segments preferably have the shape of circular ring segments that are in abutting contact with the yoke having a lengthened shape and with the radial side surfaces of the stator ring segments. These stop elements in form of circular ring segments are screwed onto the fixed machine part preferably in such a way that their inner side pointing in direction of the magnets is arranged as an extension of the inner sides of the stator ring segments. The yokes of the stator ring segments, the outer side of which at the same time forms the outer side of the stator ring segments, are configured longer than the stator ring segments on both sides and bear with the inner sides of their extensions against the outer sides of the stop elements. The radial side surfaces of the stator ring segments that are disposed at shorter distances to one another, in contrast, bear against the side surfaces of the stop elements, so that the angular position of the stator ring segments relative to one another and their interferric gap with the magnets are defined and assured. However, it is also possible to fix, in place of circular ring-shaped stop elements, appropriate stop pins or the like on the fixed machine part, against which pins the lengthened yokes and the radial side surfaces of the stator ring segments bear in the same way.

Moreover, a further advantageous development of the direct drive configured according to the invention is that one of the stop elements is conceived at the same time as a holder for a scanning sensor that, with an incremental or absolute, magnetic or inductive angular pitch graduation, forms on the rotating machine part, a measuring system for determining of the position of the rotating machine part. It has proved to be particularly advantageous to fix the scanning sensor directly on one of the stop elements and to arrange the angular pitch graduation on the outer peripheral surface of the rotating outer bearing ring of the rolling bearing which is arranged between the machine parts. In this way, it is possible to detect the respective angular position of the turntable of the rotation machine on the outer bearing ring itself, i.e. directly and in a torsion-proof manner and thus without errors and to permanently regulate the position of the turntable through interaction with a position control system implemented in the servo controller. Alternatively, however, it is also possible to fix the scanning sensor on the end face of the fixed inner bearing ring and to arrange the angular pitch graduation on the inner peripheral surface of the rotating outer bearing ring.

A preferred form of embodiment of the direct drive configured according to the invention is to configure the direct drive as an inner-rotor motor in which the magnets of the torque motor and the angular pitch graduation of the measuring system are preferably arranged on the outer peripheral surface of the outer bearing ring of the rolling bearing that is connected to the rotating machine part, and in which the stator surrounds the outer bearing ring. In an alternative form of embodiment of the direct drive configured according to the invention, however, it is possible to make the direct drive as an outer-rotor motor in which the magnets of the torque motor and the angular pitch graduation of the measuring system is arranged on the inner peripheral surface of the inner bearing ring of the rolling bearing that is connected to the rotating machine part, and in which the stator surrounds the inner bearing ring.

Finally, it is proposed as an advantageous further development of the direct drive configured according to the invention to seal the stator ring segments and the stop elements of the stator as well as the scanning sensor and the angular pitch graduation of the measuring system including the magnets from environmental influence through an annular housing out of stainless steel pot-shaped sheets. This has proved to be particularly advantageous in the case of beverage bottling plants because this prevents the penetration of liquids into the drive and thus reduces the expenses for maintaining the cleanness of the beverage bottling plant.

The direct drive for a rotation machine configured according to the invention thus has the advantage over the direct drives known from the prior art that the stator of the torque motor is configured as a complete full ring of 360° that always covers all the magnets on the rotating machine part independently of the diameter, the torque and the circumferential speed of the turntable of the rotation machine and thus no longer comprises any exposed angular regions between individual stators and the magnets that could be a potential source of danger for the assemblers and the operators. At the same time, the complete full ring is available for torque transmission to the turntable, so that a reduction of the track height and the track width of the permanent magnets and therefore makes it possible to save high-cost magnetic material. The build-up of the stator out of individual, series-connected stator ring segments with intermediately disposed stop elements that therefore cannot be separately operated has the advantage that the time and costs for the laying of cables of all the stator ring segments is substantially lower than that for separately connected stators and that, in case of repair and maintenance, individual stator ring segments can be replaced in radial direction without the need of disassembling or lifting the heavy turntable of the rotation machine. It is true, of course, that if in such a case of repair of maintenance, one of the stator ring segments is removed, the entire stator is not operable due to the interrupted flow of current through all of the stator ring segments, but this is not a drawback because, in the case of maintenance or repair, all the drives are de-energised. Moreover, by reason of the stator ring segments and the stop elements arranged between these, the radially inwardly acting magnetic forces of attraction between the stator ring segments and the permanent magnets are supported within the thus formed stator ring, so that the fixed machine part and the bearing ring of the rolling bearing connected to this can no longer get deformed.

In addition, the reliability of the direct drive of the invention on container treatment machines can be furthered enhanced if the rolling bearing arranged between the fixed and the rotating machine part is equipped with a lubricant quality sensor known from DE 10 2007 042 254 A1. This can be fixed in such a way in a radial bore in the fixed bearing ring, which bore extends to within the rolling element raceway that, through its sensitive front end, the water content, the ageing, the temperature and the degree of impurity of the lubricant in the rolling element raceway can be continuously measured during the operation of the plant. As soon as one of these measured values exceeds the respective pre-set threshold value, a warning signal is transmitted via a strobing electronic unit to the machine controls, so that a re-lubrication through a grease pump arranged in a further radial bore inside the bearing ring, or maintenance work can be implemented. In particular, in the case of beverage bottling plants it has proved to be particularly advantageous to monitor the level of humidity of the lubricant in the rolling bearing of the turntable because beverage bottling plants are treated regularly with aqueous cleansing agents and disinfectants. With the help of the lubricant quality sensor it is then possible to implement re-lubrication through the grease pump only if this is really required, so that, in this way, the input of lubricant into the rolling bearing is optimised and the maintenance of the cleanness of the entire machine is improved.

A further enhancement of the reliability and availability of the direct drive of the invention on container treatment machines is possible, in addition, if a state monitoring system, known per se, is likewise integrated into the rolling bearing between arranged between the fixed and the rotating machine part. Such a state monitoring system consists substantially of an acceleration sensor with a downstream amplifier and evaluation system, with the help of which vibrations or solid-borne sound, which occur when rolling elements roll over damaged raceways on one or both of the bearing rings, can be detected and evaluated. The acceleration sensor is screwed in such a way into a further radial bore in the inner peripheral surface of the fixed bearing ring that it is arranged very close to and opposite the rolling element raceway and the rolling elements.

Finally, a further advantage of the direct drive configured according to the invention over the direct drives known from the prior art with a plurality of separate sensors in which individual temperature sensors are used to measure the coil temperature of each stator and which, in the case of the pre-set temperature switching point being exceeded, have to be de-energised through the servo controller, consists in that only one single stator ring segment has to be equipped with a temperature sensor for monitoring the coil temperature and be connected to the servo controller, because all the stator ring segments together form a functional torque motor only in interaction with one another and only when arranged to form a full stator ring.

BRIEF DESCRIPTION OF THE DRAWINGS

A preferred form of embodiment of the direct drive configured according to the invention will be described more closely in the following with reference to the attached drawings. The figures show.

DETAILED DESCRIPTION OF THE PREFERRED EMBODIMENTS

Figure 1:
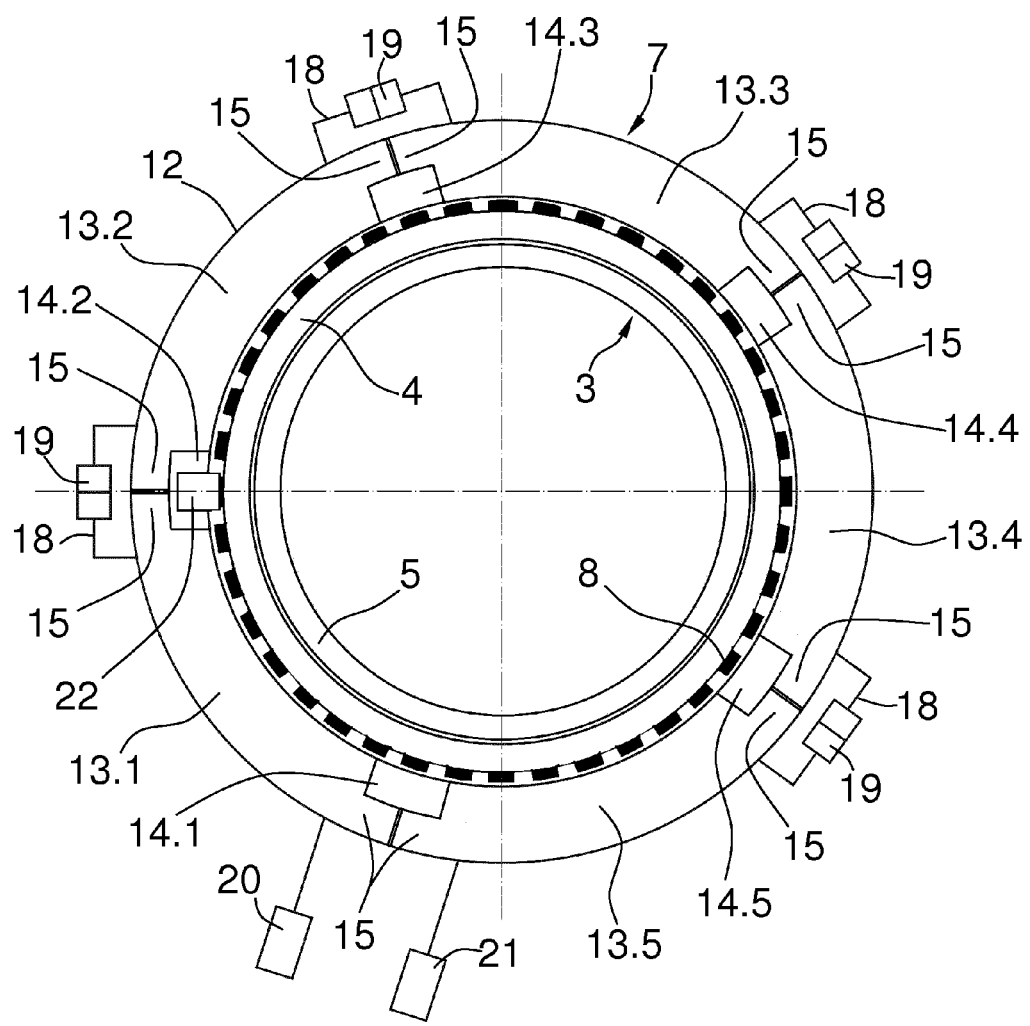
FIG. 1, a schematic representation of a top view of a direct drive configured according to the invention, for a container treatment machine.
Figure 2:
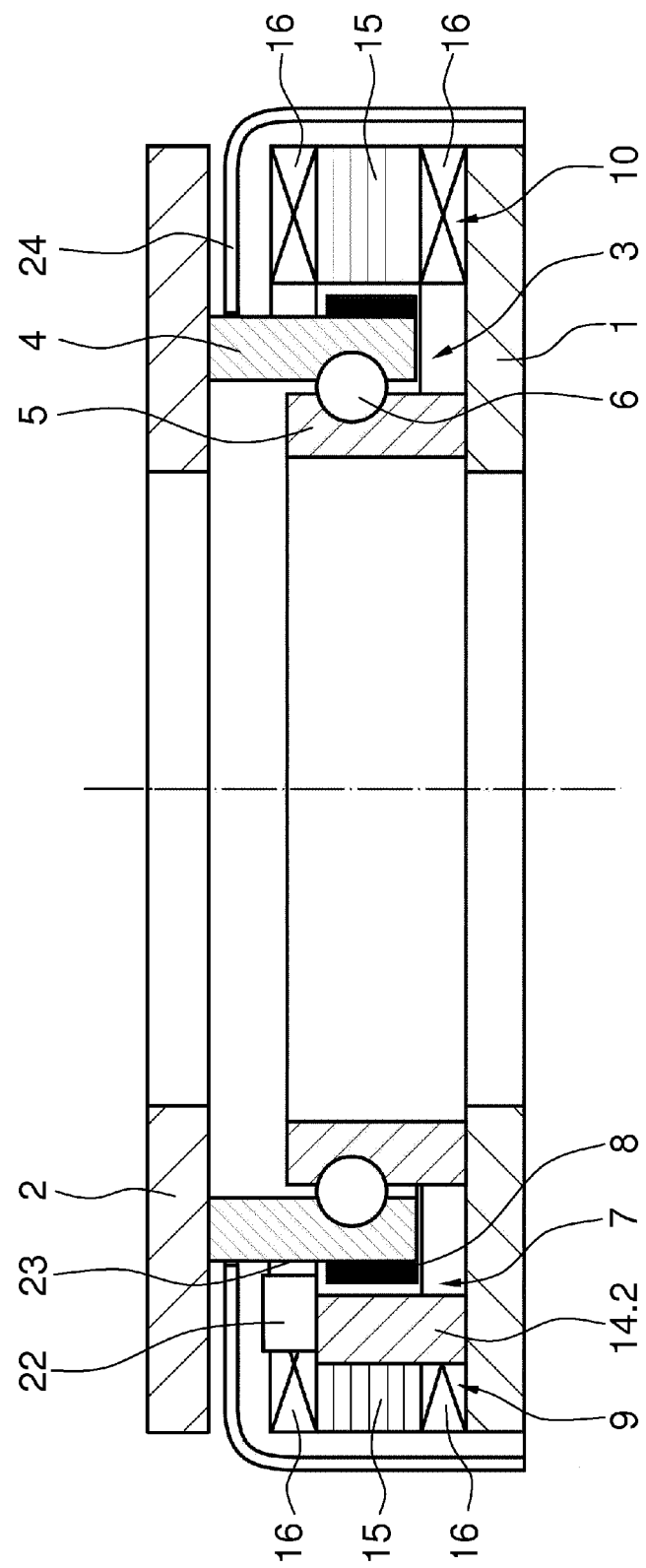
FIG. 2, the enlargement of a cross-section through the direct drive of the invention, with a fixed machine part and a rotating machine part.

The sectional representation shown in FIG. 2 discloses a direct drive suitable for a container treatment machine. The direct drive is made up substantially of a fixed machine part 1 and a machine part 2 rotating about a vertical axis of the machine; the rotating machine part 2 is rotatably connected to the fixed machine part 1 through a rolling bearing 3 which is arranged between the machine parts 1, 2 and comprises an outer bearing ring 4, an inner bearing ring 5 and a plurality of rolling elements 6 that roll between said bearing rings 4, 5, which rotating machine part can be driven by a torque motor 7. In a combined view with FIGS. 1 and 3 it becomes clear that a plurality of magnets 8 is arranged circumferentially on the rotating machine part 1 and that a stator 12 made up of a plurality of electric coils 9, 10, 11 is arranged on the fixed machine part 1 so that, through an electromagnetic field generated upon energising of the stator 12, in interaction with the magnets 8, the rotating machine part 2 can be put into a defined rotational movement.

In addition, it can be seen in FIG. 1 that, as proposed by the invention, the stator 12 on the fixed machine part 1 is configured as a full ring of 360° that covers all the magnets 8 on the rotating machine part 2, without a gap, and is made up of a plurality of stator ring segments 13.1, 13.2, 13.3, 13.4, 13.5 arranged adjoining one another and connected to one another through an electrical series connection, and of a plurality of stop elements 14.1, 14.2, 14.3, 14.4, 14.5 that are arranged between the stator ring segments 13.1, 13.2, 13.3, 13.4, 13.5 and serve to fix the stator ring segments 13.1, 13.2, 13.3, 13.4, 13.5 in peripheral and in radial direction. In an exemplary embodiment, the magnets 8 of the torque motor 7 are arranged on the outer peripheral surface of the outer bearing ring 4 of the rolling bearing 3 that is connected to the rotating machine part 1, while the stator 12 surrounds the outer bearing ring 4 completely.

Figure 3:
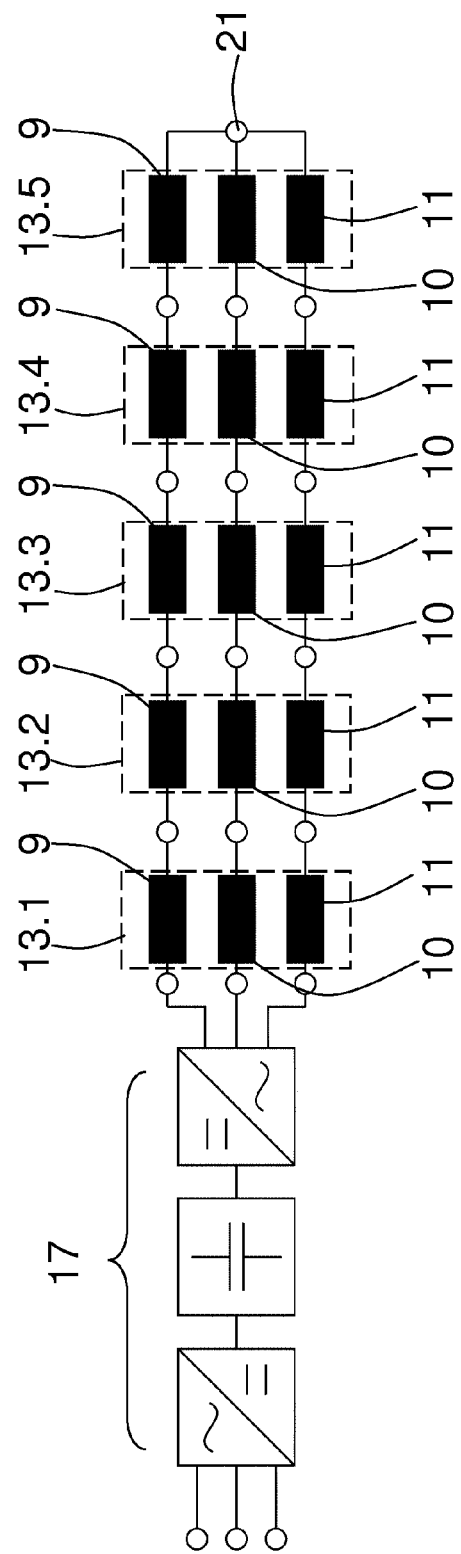
FIG. 3, the schematic representation of the electrical connection scheme of the direct drive configured according to the invention.

As can be seen further in FIGS. 1 and 2, the individual stator ring segments 13.1, 13.2, 13.3, 13.4, 13.5 of the stator 12 are made respectively of a ferrous metal yoke 15 and of a plurality of toothed metal sheets 16, stacked on one another on the upper and lower side of the yoke 15, and copper coils are wound around the teeth of the metal sheets to form the individual electric coils 9, 10, 11. As illustrated in FIG. 3, these individual coils 9, 10, 11 are connected through a star-delta connection electrically in series in three electrical phases offset to one another by 120° and can be activated through a single servo controller, not shown, with a voltage intermediate-circuit converter 17. All the adjoining stator ring segments 13.1, 13.2, 13.3, 13.4, 13.5 are connected to one another through a respective connecting cable 18 with a plug connector 19, and only one first and one last stator ring segment 13.1, 13.5 comprises, in place of a connecting cable 18, a servo controller connection 20 and a star-delta element 21 respectively.

FIG. 1 likewise shows that the stop elements 14.1, 14.2, 14.3, 14.4, 14.5 arranged between the stator ring segments 13.1, 13.2, 13.3, 13.4, 13.5 have the shape of circular ring segments that are in abutting contact with the lengthened yokes 15 and with the radial side surfaces, not specifically referenced, of the stator ring segments 13.1, 13.2, 13.3, 13.4, 13.5. In addition, the stop element 14.2 arranged between the stator ring segments 13.1 and 13.2 also serves as a holder for a scanning sensor 22 that forms, together with an incremental or absolute, magnetic or inductive angular pitch graduation 23 arranged, as shown in FIG. 2, likewise on the outer peripheral surface of the outer bearing ring 4 of the rolling bearing 3 connected to the rotating machine part 1, a measuring system for determining the position of the rotating machine part 1.

Finally, it can be seen in FIG. 2 that the stator ring segments 13.1, 13.2, 13.3, 13.4, 13.5 and the stop elements 14.1, 14.2, 14.3, 14.4, 14.5 of the stator 12 as also the scanning sensor 22 and the angular pitch graduation 23 of the measuring system including the magnets 8 are sealed from environment influence by an annular housing 24 made of stainless steel pot-shaped sheets. This has proved to be particularly advantageous, in particular in the case of direct drives for beverage bottling plants because, in this way, the penetration of liquids into the direct drive is avoided.

| List of reference numbers | |
|---|---|
| 1 | Fixed machine part |
| 2 | Rotating machine part |
| 3 | Rolling bearing |
| 4 | Outer bearing ring of 3 |
| 5 | Inner bearing ring of 3 |
| 6 | Rolling element of 3 |
| 7 | Torque motor |
| 8 | Magnets |
| 9 | Coils |
| 10 | Coils |
| 11 | Coils |
| 12 | Stator |
| 13.1 | Stator ring segment |
| 13.2 | Stator ring segment |
| 13.3 | Stator ring segment |
| 13.4 | Stator ring segment |
| 13.5 | Stator ring segment |
| 14.1 | Stop element |
| 14.2 | Stop element |
| 14.3 | Stop element |
| 14.4 | Stop element |
| 14.5 | Stop element |
| 15 | Yokes of 9, 10, 11 |
| 16 | Toothed sheets of 9, 10, 11 |
| 17 | Voltage intermediate-circuit converter |
| 18 | Connecting cable |
| 19 | Plug connector |
| 20 | Servo controller connection |
| 21 | Star-delta element |
| 22 | Scanning sensor |
| 23 | Angular pitch graduation |
| 24 | Housing |

The invention claimed is:

1. A direct drive for a rotation machine, comprising a fixed machine part and a machine part which rotates about a vertical machine axis and is rotationally connected to the fixed machine part by a roller bearing arranged between the two machine parts that includes an outer bearing ring, an inner bearing ring and a plurality of rolling elements rolling between said bearing rings, and which is driven by a torque motor, a plurality of peripherally continuously arranged magnets on the rotating machine parts and a stator made up of a plurality of electric coils arranged on the fixed machine part, the rotating machine part being rotatable by an electromagnetic field generated by energizing the stator, in interaction with the magnets, to be set into a defined rotational motion, the stator on the fixed machine part is configured as a full ring of 360°, and covers all the magnets on the rotating machine part without any gap while being made up of a plurality of adjoining stator ring segments that are connected to one another through an electrical series connection, and a plurality of stop elements disposed between the stator ring segments that fix the stator ring segments in circumferential and in radial directions, wherein each of the individual stator ring segments comprises a ferrous metal yoke and a plurality of toothed metal sheets stacked on one another on an upper and a lower side of the yoke with copper coils wound around teeth of the sheets for forming individual electric coils.

2. The direct drive according to claim 1, wherein the stop elements arranged between the stator ring segments have a shape of circular ring segments that are in abutting contact with the yoke, which has a lengthened shape, and with radial side surfaces of the stator ring segments.

3. The direct drive according to claim 1, wherein the ferrous metal yoke is longer than the toothed metal sheets such that an extension of the yoke is formed with inner sides of the extensions bearing against outer sides of the stop element.

4. A direct drive for a rotation machine, comprising a fixed machine part and a machine part which rotates about a vertical machine axis and is rotationally connected to the fixed machine part by a roller bearing arranged between the two machine parts that includes an outer bearing ring, an inner bearing ring and a plurality of rolling elements rolling between said bearing rings, and which is driven by a torque motor, a plurality of peripherally continuously arranged magnets on the rotating machine parts and a stator made up of a plurality of electric coils arranged on the fixed machine part, the rotating machine part being rotatable by an electromagnetic field generated by energizing the stator, in interaction with the magnets, to be set into a defined rotational motion, the stator on the fixed machine part is configured as a full ring of 360°, and covers all the magnets on the rotating machine part without any gap while being made up of a plurality of adjoining stator ring segments that are connected to one another through an electrical series connection, and a plurality of stop elements disposed between the stator ring segments that fix the stator ring segments in circumferential and in radial directions, wherein each of the individual stator ring segments comprises a ferrous metal yoke and a plurality of toothed metal sheets stacked on one another on an upper and a lower side of the yoke with copper coils wound around teeth of the sheets for forming individual electric coils, and wherein the individual coils of the stator ring segments are connected electrically in series through a star-delta connection with three electrically offset phases of 120° and are controllable through a single servo controller with a voltage intermediate-circuit converter.

5. The direct drive according to claim 4, wherein all adjoining ones of the stator ring segments are connected via a respective connecting cable to one another with a plug connector and only one first and one last one of the stator ring segments comprises, in place of a connecting cable, a servo controller connection or a star-delta element.

6. A direct drive for a rotation machine, comprising a fixed machine part and a machine part which rotates about a vertical machine axis and is rotationally connected to the fixed machine part by a roller bearing arranged between the two machine parts that includes an outer bearing ring, an inner bearing ring and a plurality of rolling elements rolling between said bearing rings, and which is driven by a torque motor, a plurality of peripherally continuously arranged magnets on the rotating machine parts and a stator made up of a plurality of electric coils arranged on the fixed machine part, the rotating machine part being rotatable by an electromagnetic field generated by energizing the stator, in interaction with the magnets, to be set into a defined rotational motion, the stator on the fixed machine part is configured as a full ring of 360°, and covers all the magnets on the rotating machine part without any gap while being made up of a plurality of adjoining stator ring segments that are connected to one another through an electrical series connection, and a plurality of stop elements disposed between the stator ring segments that fix the stator ring segments in circumferential and in radial directions, wherein each of the individual stator ring segments comprises a ferrous metal yoke and a plurality of toothed metal sheets stacked on one another on an upper and a lower side of the yoke with copper coils wound around teeth of the sheets for forming individual electric coils, and wherein one of the stop elements acts as a holder for a scanning sensor that, with an incremental or absolute, magnetic or inductive angular pitch graduation, forms on the rotating machine part, a measuring system for determining a position of the rotating machine part.

7. The direct drive according to claim 6, wherein the magnets of the torque motor and the angular pitch graduation of the measuring system are arranged on an outer peripheral surface of the outer bearing ring of the rolling bearing that is connected to the rotating machine part and in which the stator surrounds the outer bearing ring.

8. The direct drive according to claim 7, wherein the stator ring segments and the stop elements of the stator as well as the scanning sensor and the angular pitch graduation of the measuring system including the magnets are sealed from environmental influence by an annular housing made of stainless steel pot-shaped sheets.

* * * * *